(No Model.) 3 Sheets—Sheet 1.

H. F. SHOWMAN.
BEEHIVE.

No. 479,725. Patented July 26, 1892.

Witnesses
M. E. Fowler
H. P. Riley

Inventor
Henry F. Showman
By his Attorneys,
C. A. Snow & Co.

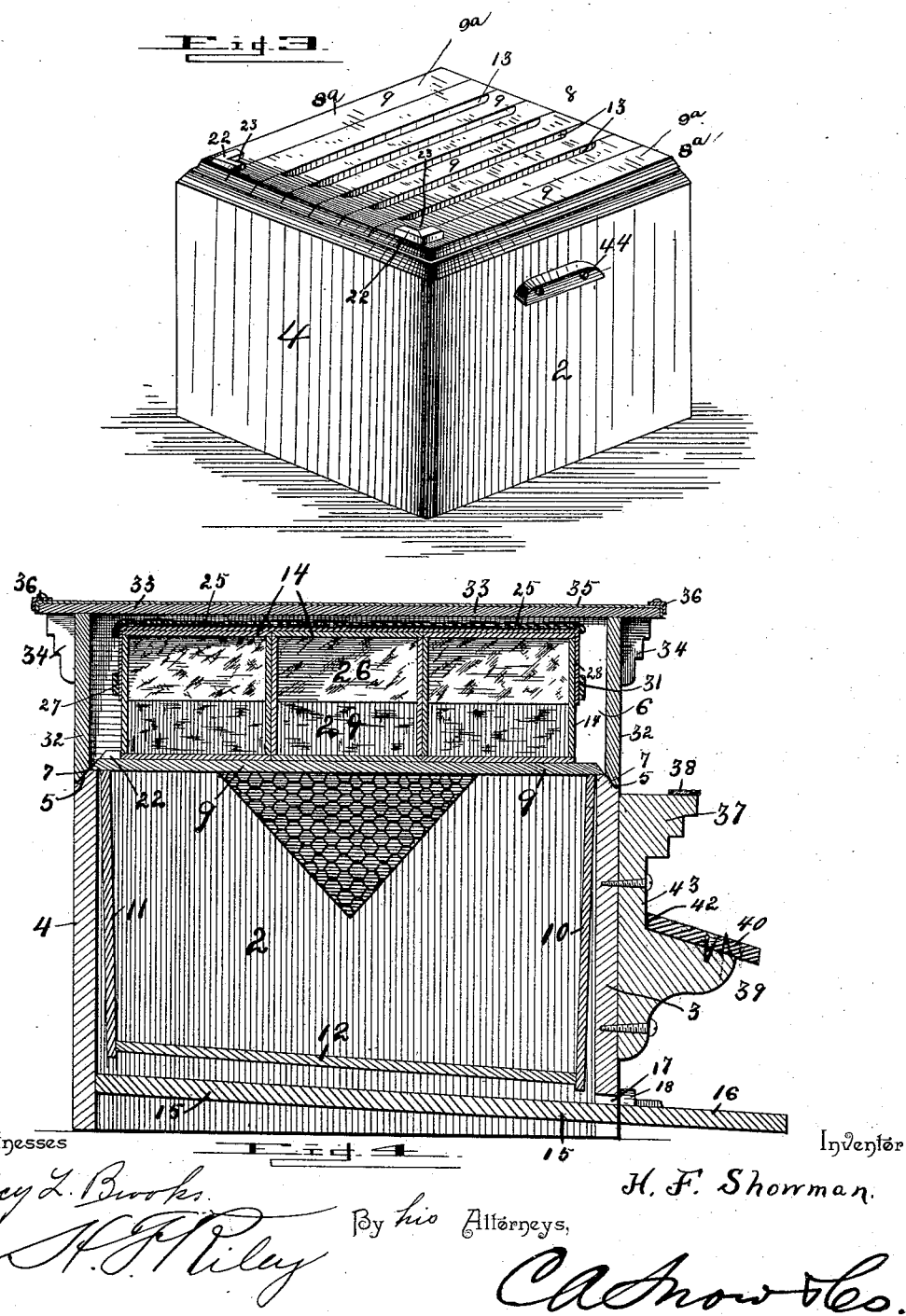

(No Model.) 3 Sheets—Sheet 3.
H. F. SHOWMAN.
BEEHIVE.
No. 479,725. Patented July 26, 1892.
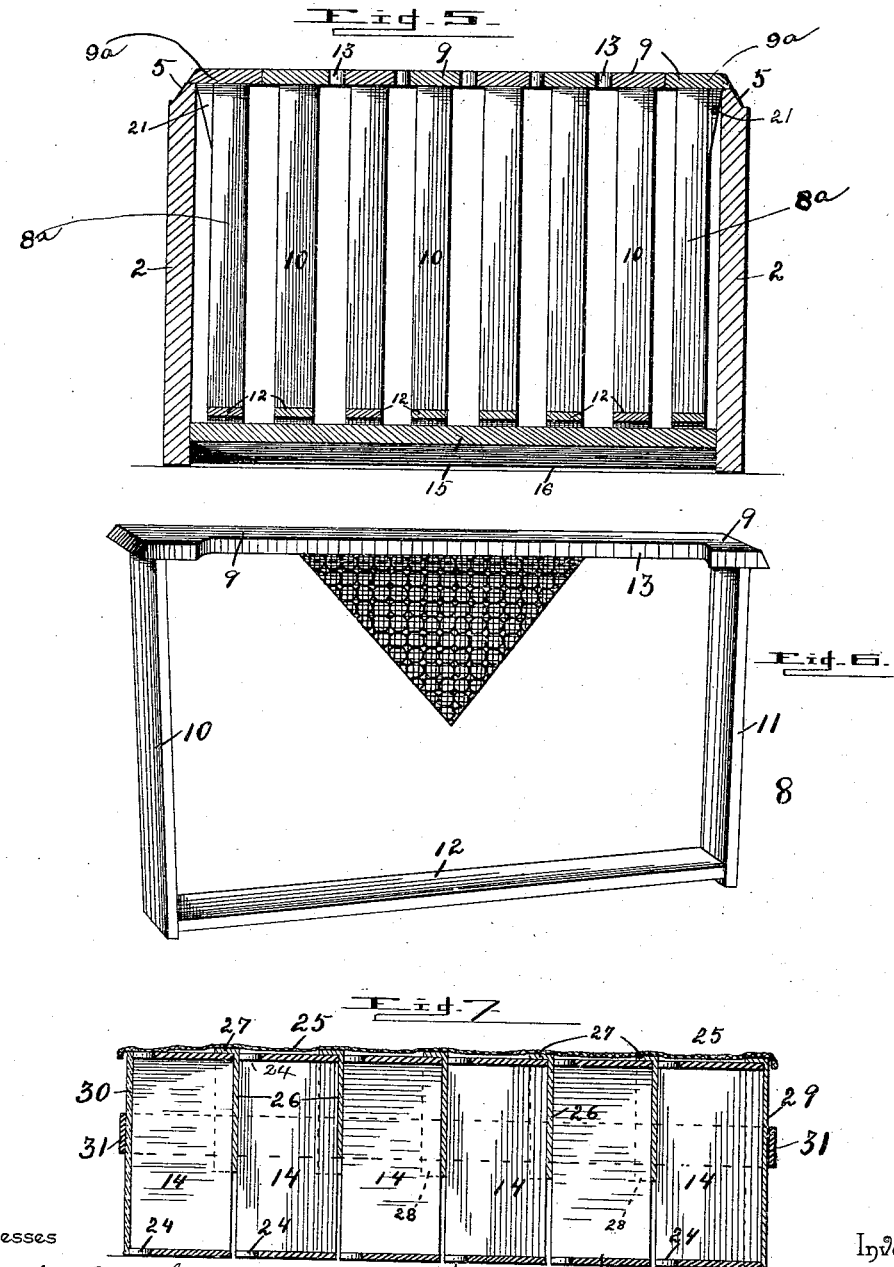
Witnesses
Percy L. Brooks.
H. F. Riley
By his Attorneys,
C. A. Snow & Co.
Inventor
H. F. Showman.

UNITED STATES PATENT OFFICE.

HENRY FRANK SHOWMAN, OF NEWARK, OHIO.

BEEHIVE.

SPECIFICATION forming part of Letters Patent No. 479,725, dated July 26, 1892.

Application filed April 25, 1890. Serial No. 349,543. (No model.)

*To all whom it may concern:*

Be it known that I, HENRY FRANK SHOWMAN, a citizen of the United States, residing at Newark, in the county of Licking and State of Ohio, have invented a new and useful Improvement in Beehives, of which the following is a specification.

The invention relates to improvements in beehives.

The object of the present invention is to improve, simplify, and cheapen the construction of beehives and enable the apiarian to accomplish the necessary work with the minimum disturbance of the harmony of the bees, which are exceedingly sensitive to the slightest jar and are easily made irritable and uncontrollable and caused to delay their work.

A further object of the invention is to arrange the compartments of the hive so that the greatest amount of surplus honey can be stored and can be conveniently removed when the honey-boxes are filled without disturbing the bees or necessitating smoking, which more or less injures the bees and gives the honey an unpleasant flavor, and to enable the honey sections to be separated without chafing or breaking the honey-cells.

A further object is to afford means whereby the interior of the hive and the progress of the bees can be readily examined from time to time without disturbing and annoying the workers and to construct the interior of the hives in such manner that the bees will be directed to the desired portion and be excluded from other parts of the hive, and to provide a cover for the body of the hive that will be water-proof and that will be readily replaceable upon the body, and to provide an awning for the alighting-board and means for partially closing the opening thereof, when desirable, in stormy or rough weather and in winter.

The invention consists in the construction and novel combination and arrangement of parts hereinafter fully described, illustrated in the accompanying drawings, and pointed out in the claims hereto appended.

Figure 1:
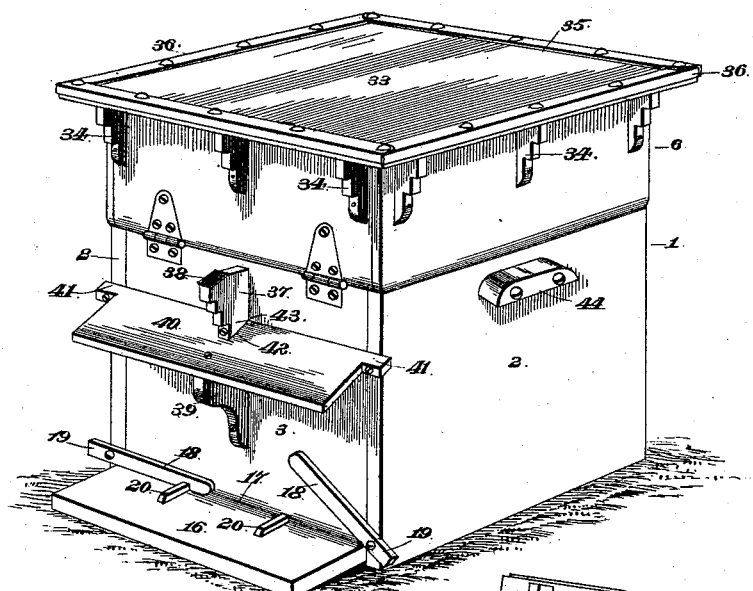
Figure 2:
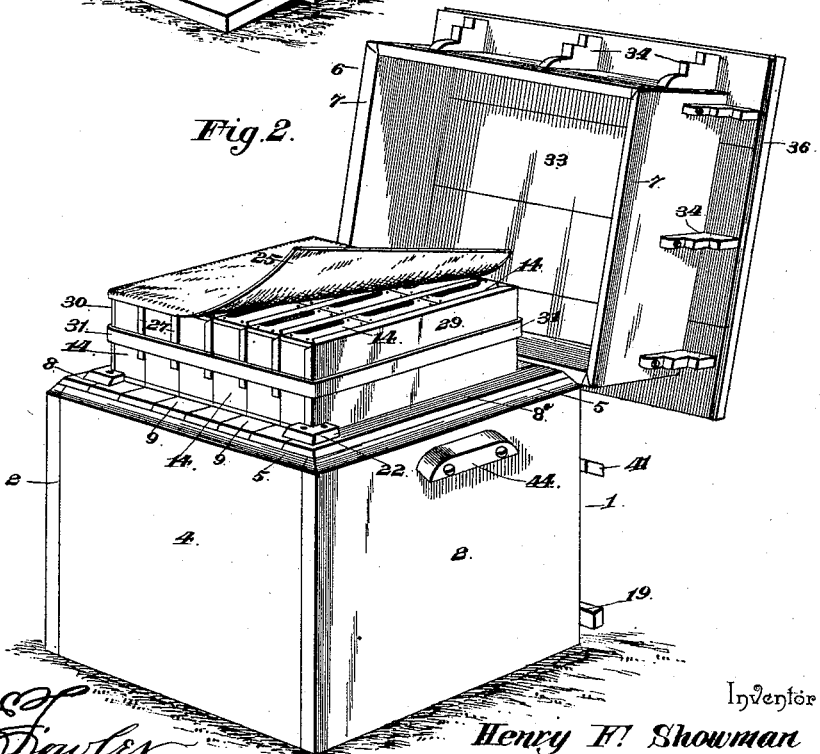

In the drawings, Figure 1 is a perspective view of a beehive constructed in accordance with this invention. Fig. 2 is a similar view, the cover being raised or open. Fig. 3 is a similar view, the cover and the series of honey-sections being removed. Fig. 4 is a vertical sectional view. Fig. 5 is a similar view taken at right angles to Fig. 3. Fig. 6 is a detail perspective view of one of the brood-frames. Fig. 7 is a detail sectional view of the series of honey-sections.

Referring to the accompanying drawings, 1 designates the body, which is constructed of suitable material, and consists of the sides 2, 2, 3, and 4, which are of the same width and have their upper edges 5 forming a square, and adapted to receive a similar-shaped cover 6 that may be hinged, as illustrated in the accompanying drawings, or the hinges may be omitted, and in the latter case the cover may be readily placed upon the body 1 without fitting one of its sides to a corresponding side of the body. The edges 5 of the sides of the body have their outer halves beveled longitudinally to form a tight joint with the cover, the lower edges 7 of which are beveled and conform to the configuration of the edges of the body, and the level portion of the edges 5 supports the brood-frames 8, that have the ends of their top pieces 9 beveled and forming a continuation of the beveled portion of the sides 2 2, 3, and 4, and the end frames 8ª have the outer edges of their top pieces 9ª similarly beveled. The brood-frames are composed of the top bars or pieces 9, side bars 10 and 11, and the bottom bar 12, and are preferably eight in number, and are provided with recesses 13, which are between the second strips (or those adjacent to the end ones) and the inner pieces 9, and these recesses 13 are formed by cutting away a portion of the top pieces 9, and thus provide passages that communicate with recesses 24 of the honey-sections 14 and enable the bees to pass from the brood-chamber upward into the honey-sections. The side bars 10 and 11 are inwardly inclined and have their lower ends connected by the bottom bar 12, that is shorter than the top piece 9 and slants to conform to the inclination of a bottom 15. By inwardly inclining the side bars 10 and 11 the brood-frames are free from the sides of the hive and may be removed without interfering with the body of the hive or the adjacent frames. The front side 3 extends within a short distance of the bottom of the hive and leaves a transverse open space between its lower edge and the bottom 15, which is secured to the sides 2 and 4 and is arranged at a slight inclination and extends beyond the body to form an alighting-board 16, and the said bottom braces, and supports the sides of the body. The lower edge of the front side 3 is inwardly beveled and is parallel with the bottom 15 to provide an opening 17 for the entrance and exit of the bees, and the said opening is of the same size throughout its length and may be partially closed, when desired, by strips 18, that are pivoted to sides 2 2, near each end of the opening 17, and are adapted to be turned on their pivots to close the opening 17 partially in bad weather, and the strips 18 when closed have their adjacent ends a slight distance apart, which leaves a small opening for the passage of the bees. The strips 18 are each pivoted a short distance from one of its ends 19, which abuts against the side of the alighting-board when the strip is vertical and prevents the same swinging beyond the side of the body, and the strips 18 are braced in their closed position by blocks 20, secured to the upper face of the alighting-board and arranged to engage the strips a short distance from their inner adjacent ends and serve to brace and hold the strips against the body and prevent warping.

The honey-sections 14, in which is stored the surplus honey, are arranged above the brood-chamber and are supported upon the top pieces 9 and 9ª of the brood-frames, and the brood-frames 8 are held closely together and prevented accidentally jarring against one another by wedge-shaped blocks 21, that are secured to the outer edges of the side bars 10 and 11 of the end frames 8ª at points immediately below the top pieces 9ª, and these wedge-shaped blocks engage the adjacent sides of the body 1 and hold the frames together. The end frames are provided with L-shaped guide-plates 22, that are arranged on the rear ends of the end pieces and that receive in their recesses 23 the corners of the honey-sections and enable the latter to be quickly and accurately placed in position upon the brood-frames and adjusted to bring their recesses 24 to register with the recesses 13 in the top bars of the brood-frames and provide a passage from the brood-chamber to the interior of the honey-sections.

The honey-sections are of the ordinary construction and preferably designed to contain a pound of honey, and are provided with the recesses 24, which when the honey-sections are arranged together, as illustrated in the accompanying drawings, form passages, the lower ones of which register with the recesses 13 of the brood-frames, and the upper recesses are closed by a cloth or blanket 25. The honey-sections 14 are arranged in rows of three each and are separated by division-plates 26, that partially separate the sections and facilitate the work of the bees, and are provided at their upper and side edges with flanges 27 and 28, that engage the faces of the honey-sections, and the said division-plates cover about two-thirds of the open faces of the honey-sections and form partitions. The row at one end of the series of honey-sections is provided with a plate 29, constructed similarly to the division-plates 26, but is slightly larger and entirely closes the adjacent faces of the honey-sections, and the row of sections at the other end of the series has the faces of the sections closed by a glass plate 30, which permits the interior of the honey-sections to be examined. The rows of honey-sections are held together by an elastic band 31, and they are adapted to be readily removed from the hive and replaced therein without disturbing or annoying the bees and without necessitating smoking, which is a great advantage, as the bees are more or less injured by being stupified by smoke, and the honey-sections by their particular construction can be readily separated without chafing or otherwise injuring the honey-cells.

The recesses at the top of the honey-sections are closed by the blanket or cloth 25, and when it is desired to inspect the interior of the sections and ascertain the progress of the bees the blanket or cloth, which may be constructed of any desired fabric, can be rolled and the recesses of the honey-sections exposed without jarring the hive or annoying the inmates, as is the case where a honey-board is employed to close those recesses, as the bees are exceedingly sensitive to the slightest jar and will immediately cease their work, and they are easily irritated and become uncontrollable at the slightest external interference. The cloth or blanket 25, which closes the recesses of the honey-sections during summer, is employed in winter, when the honey-sections are removed, to close the recesses 13 of the brood-frames and to maintain the interior of the hive at the desired temperature.

The cover 6 of the hive is composed of similar side boards 32, that have their ends secured together, and an upper board or roof 33, that projects beyond the sides and consists of separate strips, and the edges of the upper board or roof that extend beyond the sides 32 are supported by ornamental brackets 34. The upper board or roof 33 is covered by water-proof material 35, and is prevented warping by metallic flange-strips 36, that extend around the edges of the upper board or roof and are secured thereto by headed nails or other suitable means. The cover 6, when swung back to open the hive, is supported by a bracket 37, the upper edge of which is provided with a piece of cloth 38 or other suitable sound-deadening material, which acts as a cushion and prevents the slightest jar to the hive when the cover is swung open. The bracket 37 is provided with an inclined shoulder 39, which supports and has secured to it an inclined board 40, that forms an awning for the bee-opening 17. The awning-board 40 is provided at its ends with offsets 41, through which pass screws or other suitable means for securing the board to the body of the hive, and the said board 40 is provided at a point intermediate of its ends with a recess 42, which receives the narrow portion or neck 43 of the bracket 37 and permits the board to rest upon the inclined shoulder 39 and to have its inner edge arranged contiguous to the adjacent side of the body.

The sides 2 2 of the hive are provided with blocks 44, that serve as handles to facilitate moving the hive.

From the foregoing description and the accompanying drawings it will readily be seen that the beehive is simple and comparatively inexpensive in construction and is capable of permitting the apiarian to perform all the duties connected with the hive without disturbing or in any manner annoying the bees and without necessitating the smoking ordinarily employed to stupefy the bees, and it will be seen that the interior of the hive is economically arranged and the bees are directed to the portions intended for them and are excluded from other parts of the hive, and that the honey-sections for superfluous honey can be quickly removed from the hive and accurately replaced therein and can be separated without injuring the honey-cells.

What I claim is—

1. In a beehive, the combination of the body provided with an inclined bottom board extended beyond the front side to form an alighting-ledge, said body being provided with a bee-opening 17, the strips having their outer ends pivoted to the body and folding inward to close partially the bee-opening when in a horizontal position and having extended ends 19, arranged to engage the extended portion of the bottom board when in a perpendicular position, and the blocks so secured to the upper face of the alighting-ledge and arranged at intervals, substantially as described.

2. In a beehive, the combination of the brood-frames 8 and 8ª, the upper bars of which have recesses, the L-shaped guide-plates secured to the brood-frames 8ª, and the rows of honey-sections having upper and lower recesses and secured together and arranged to engage the recesses of the guide-plates, whereby the recesses in the honey-sections are readily made to register with the recesses in the brood-frames, substantially as described.

3. In a beehive, the combination of the series of honey-sections arranged in rows, the dividing-plates interposed between the rows and partially separating the sections and providing at their upper and side edges with flanges engaging the faces of the sections, the metallic end plates 29, closing the open faces of the honey-sections of one end row and provided at its top and side edges with flanges, and the transparent plate closing the sections of the other end row, substantially as described.

In testimony that I claim the foregoing as my own I have hereto affixed my signature in presence of two witnesses.

HENRY FRANK SHOWMAN.

Witnesses:
ABNER LENARD CLOUSE,
J. V. HILLIARD.